United States Patent [19]

Ausnit et al.

[11] Patent Number: 4,563,319

[45] Date of Patent: Jan. 7, 1986

[54] METHOD OF MAKING QUADRUPLE PROFILE TUBING

[75] Inventors: Steven Ausnit, New York, N.Y.; Donald L. Van Erden, Wildwood, Ill.

[73] Assignee: Minigrip, Inc., Orangeburg, N.Y.

[21] Appl. No.: 471,740

[22] Filed: Mar. 3, 1983

[51] Int. Cl.⁴ .............................................. B29C 53/36
[52] U.S. Cl. ...................... 264/146; 156/66; 156/229; 156/244.22; 156/244.25; 264/564; 264/152; 264/159; 264/177 R; 425/305.1
[58] Field of Search .............. 264/145, 146, 151, 564, 264/177 R, 152, 159; 156/244.25, 229, 66, 244.22; 425/305.1

[56] References Cited

U.S. PATENT DOCUMENTS

| | | | |
|---|---|---|---|
| Re. 29,331 | 8/1977 | Naito | 138/118 |
| 3,500,727 | 3/1970 | Behr et al. | 264/146 |
| 3,503,112 | 3/1970 | Siegel | 264/564 |
| 3,532,571 | 10/1970 | Ausnit | 425/305.1 |
| 3,945,403 | 3/1976 | Noguchi | 138/118 |
| 3,948,705 | 4/1976 | Ausnit | 156/73.4 |
| 4,249,982 | 2/1981 | Ausnit | 156/66 |
| 4,290,467 | 9/1981 | Schmidt | 150/3 |
| 4,341,575 | 7/1982 | Herz | 156/244.22 |
| 4,372,793 | 2/1983 | Herz | 156/66 |

Primary Examiner—Jeffery Thurlow
Attorney, Agent, or Firm—Hill, Van Santen, Steadman & Simpson

[57] ABSTRACT

The method of making flexible plastic bags with integral pressure interlocking rib and groove elements on the confronting top edges, comprises the steps of extruding a continuous tube with pairs of closely spaced interlocking elements on the surface of the tube, the total pairs being a multiple of 2 with at least 4 pairs on the tube, slitting the tube lengthwise between profiles of alternate pairs, and folding the tube between each adjacent pair and bringing the profile adjacent the slit over onto the closest profile of the pair which has not been slit.

14 Claims, 6 Drawing Figures

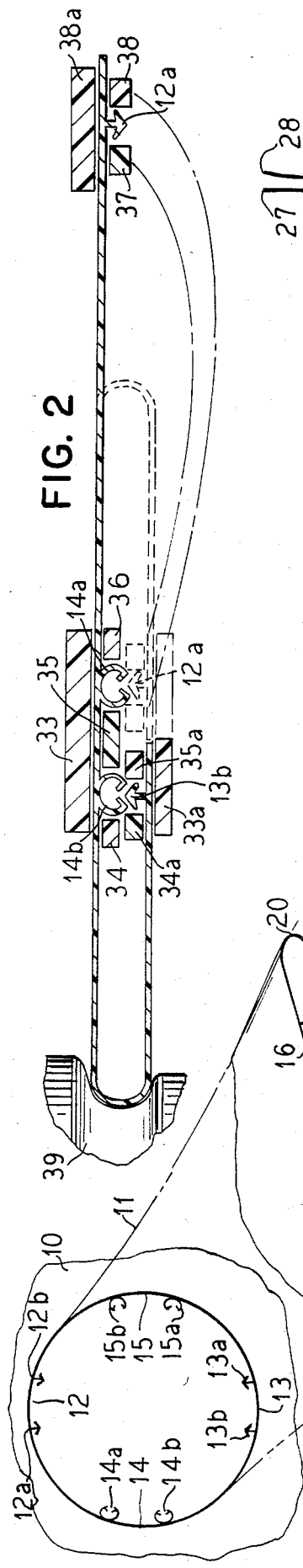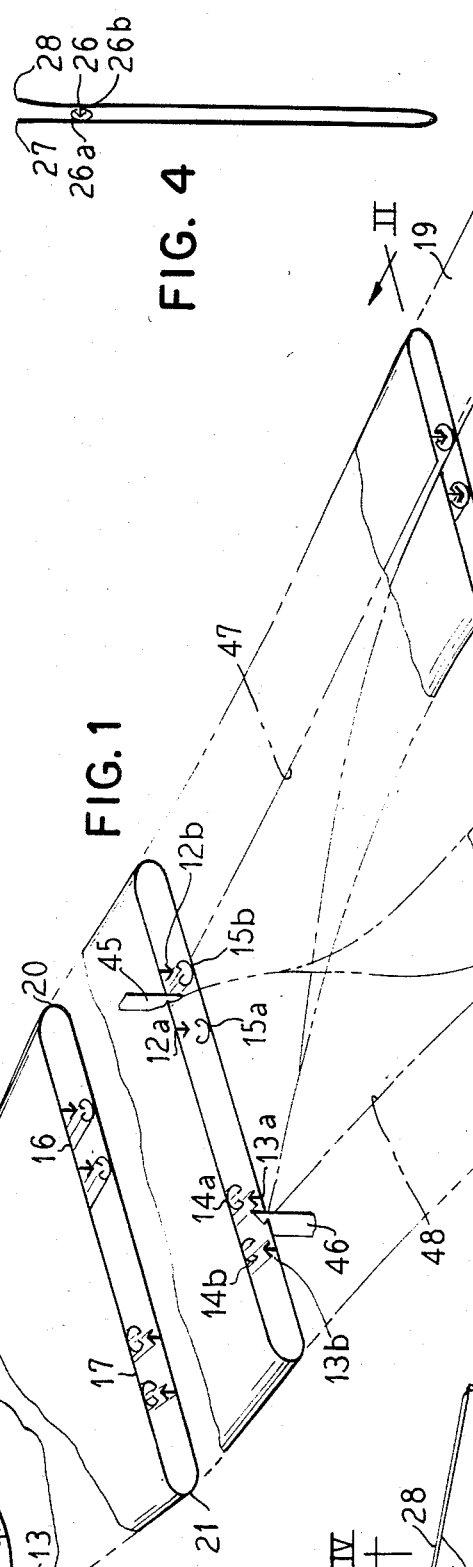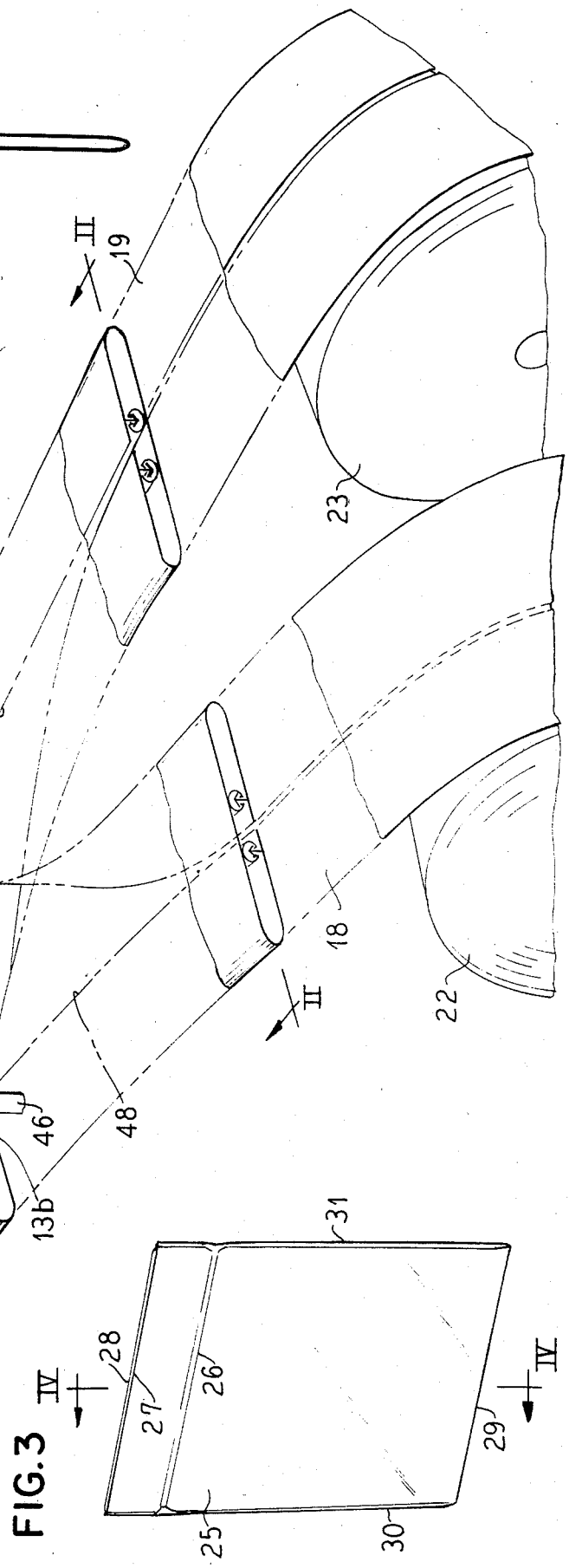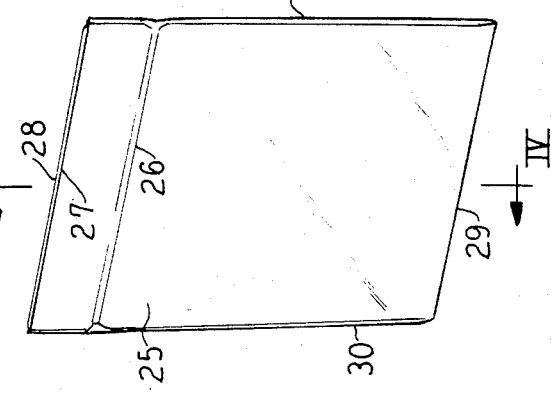

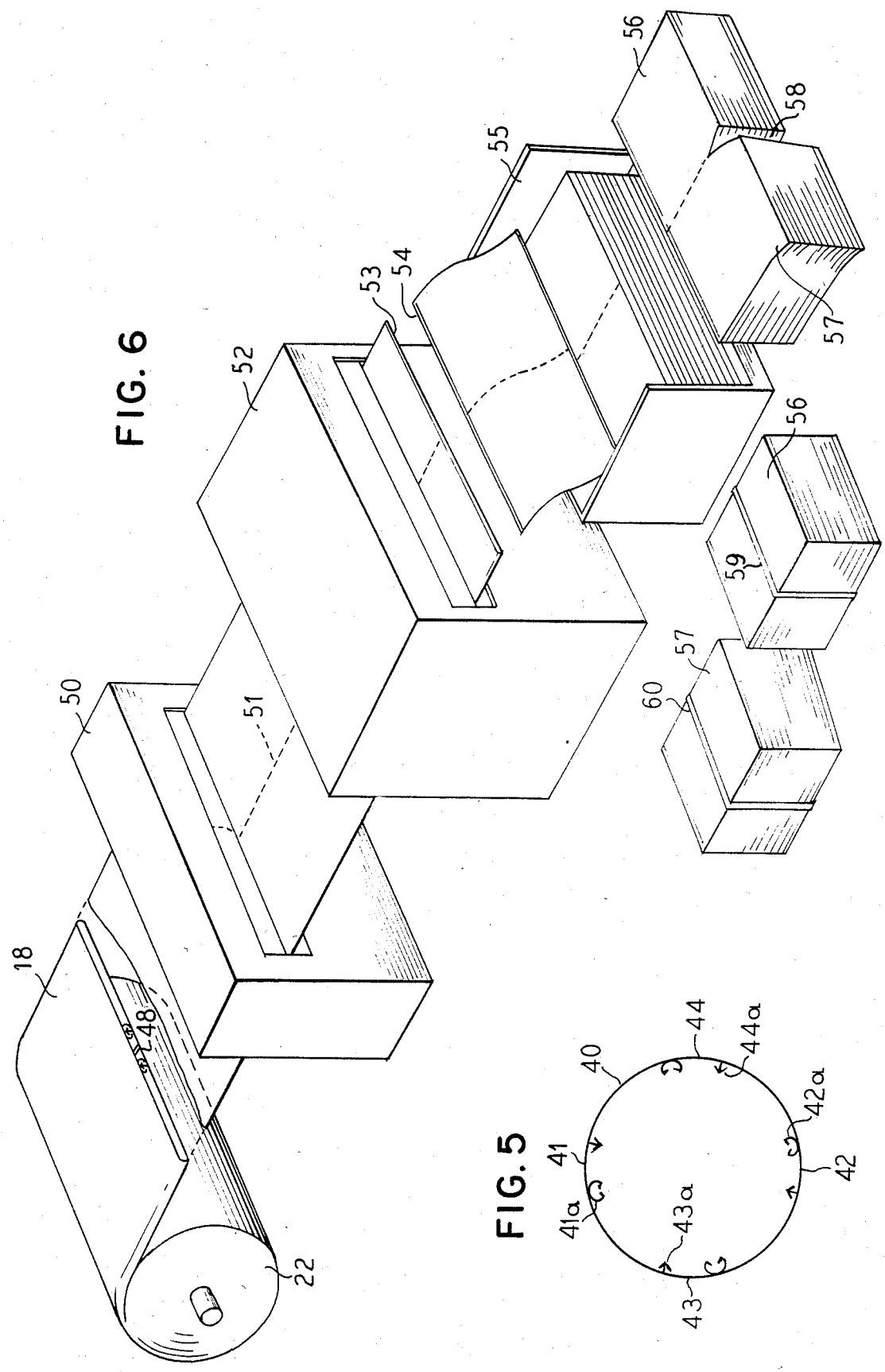

METHOD OF MAKING QUADRUPLE PROFILE TUBING

BACKGROUND OF THE INVENTION

The invention relates to improvements in methods for making plastic film bags having reclosable fasteners thereon, and particularly of the type having opposed interlocking rib and groove elements on the confronting top edges of the bags.

In the manufacture of bags of this type, continual efforts are being made to increase the speed of production output to thereby effect a saving in cost of the individual bags. There are factors which limit the speed of extrusion of the film and speed of joining of profiles so that the present concept embodies manufacturing simultaneously a plurality of bags in a unique manner so that actually, material for making four bags with each cross-sealing operation is produced simultaneously in a single tubular extrusion film.

Attempts to make multiple bags in a single extrusion operation encounter the problems of controlling the film and controlling the profiles. The profiles are joined before the film is wound or spooled in order to avoid the risk of not knowing whether or not acceptable interlocking profiles have been provided and in order to complete the continuous strip in a form which is suitable for storage without deforming the profiles or damaging the film adjacent the profiles. Methods heretofore have been employed wherein tubular film has been formed and folded in such a way so as to simultaneously make dual bags with each cross-sealing operation. However, a feature of the present invention is to provide a method and mechanism for making a double double tube wherein material for four bags is formed. The difficulty in forming a double double tube is to handle the large amount of film emanating from the extruder, collapsing the bubble of the film so that the profiles are aligned and joined and handled in such a manner so that usable strips of profile film are provided which can be formed into four bags. The handling of such a tube creates problems in where the tube is to be slit, which profiles are to be joined to each other, and the collapsing of the bubble in such a manner that a fold mark is formed where the natural fold of the eventual bag will occur.

It is accordingly an object of the present invention to provide an improved method for forming a unique tubing which is capable of being converted into four reclosable bags at one time by a single cross-cutting and sealing arrangement. More particularly, the method of the invention provides double double profile film sets or in other words, two sets of double profile film.

A further object of the invention is to provide a unique manner of slitting and folding and joining profiles in a tubing so that strips of double profile film for conversion into two sets of double bag film strips are formed.

A feature of the present invention is the formation of a continuous tube of film with eight profiles on the inner surface, and finding a satisfactory way of joining said profiles so as to form profile film strips that can be readily converted into sets of reclosable bags. One unsatisfactory manner of approaching the problem is to roll the tube into a spool after aligning the profiles, but not joining them, so that the tube is folded between profiles and then separating and rejoining the tube sections later at the bag machine. This situation creates the problem of not knowing whether or not the profiles are satisfactory until much later.

Another alternative unsatisfactory solution to handling the tube is to slit the tube into two sections which would have to be joined onto themselves and spooled.

A feature of the invention is the making of a quadruple profile tube which is then divided into two sets of double profile film wherein the profile from one of the film sections is folded into the other film sections and vice-versa. In this manner, production output can be increased substantially since two double profile films for conversion into reclosable bags are provided from one quadruple profile tube.

Other objects, advantages and features, as well as equivalent methods and apparatuses which are intended to be covered herein, will become more apparent from the teachings of the present invention in connection with the disclosure of the preferred embodiment thereof in the specification, claims, and drawings, in which:

DESCRIPTION OF THE DRAWINGS

FIG. 1 is a perspective view of a tubular plastic profile film being extruded and formed into separate double profile film strips in accordance with the principles of the present invention;

FIG. 2 is an enlarged detailed sectional view taken substantially along line II—II and illustrating mechanism which is added to the showing of FIG. 1 to accomplish the function shown schematically in FIG. 1;

FIG. 3 is a perspective view of a bag of the type which will result from the manufacturing arrangement illustrated;

FIG. 4 is a vertical sectional view through the bag of FIG. 3 taken substantially along line IV—IV;

FIG. 5 is a view of a secondary form of quadruple profile tubing, FIG. 1 illustrating the preferred form; and FIG. 6 is a perspective view illustrating a manner of handling each of the dual double strips formed by the method of FIG. 1.

DESCRIPTION OF THE PREFERRED EMBODIMENTS

As illustated in FIG. 1, an extruder 10 is provided with molten plastic which is pressure extruded through an annular slot to form a continuous film tube 11. The slot is shaped so as to form on the inner surface of the tube a series of eight profiles. The profiles are of the rib and groove type and are of complementary shape and size so as to be pressure interlockable and separable for forming reclosable fasteners at the confronting top edges of plastic film bags such as illustrated in FIGS. 3 and 4.

On the inner surface of the film is a first pair 12 of closely spaced male profiles or ribs 12a and 12b. Diametrically opposite this location relative to the tubular film is a second pair 13 of ribs 13a and 13b which are also closely spaced.

Circumferentailly between the diametrically opposite pairs 12 and 13 is a pair 14 of closely spaced female profiles or grooves 14a and 14b. Diametrically opposite the pair 14 is a second pair 15 of closely spaced grooves 15a and 15b. The spacing between the rib elements and groove elements is sufficient to provide material for pull flanges as shown in the finished bag of FIGS. 3 and 4.

As the tube is extruded and becomes preliminarily cooled, it is flattened against the resistance of the air bubble within the tube in a manner so as to align the first pair 12 of ribs with the first pair 14 of grooves thereby forming a first set 16. Similarly, the second pair 13 of ribs is aligned with the second pair 15 of grooves forming a second set 17 of ribs and grooves.

The collapsing of the tube into this alignment may occur by utilizing spaced rolls or guides correctly positioned in relationship to the ribs and grooves as they appear on the film tube.

The next step includes cutting or slitting the tube longitudinally continuously with knives 45 and 46 to form slits shown at 47 and 48 respectively. The slit formed by the knife 45 is midway between the first pair 12 of profiles which is in the upper layer of the tube which is folded at its lateral side edges 20 and 21. The slit formed by the knife 46 is midway between the second pair 13 of ribs on the lower layer of the tube. The slits are simultaneously made, but alternatively either slit can be made in advance of the other, but both slits must be completed before the tube is folded.

In the next step which uniquely forms strips 18 and 19 of profile film for conversion into double bags, the severed film is folded in such a manner so as to form two dual profile film strips. The folding is accomplished by a suitable guidance structure such as that shown in FIG. 2 where the profile 12a from the first set 16 is folded over onto the second set 17 to be interengaged with the groove 14 simultaneously with the interengagement of profiles 12b and 15b.

At substantially the same time, the profile 13a from the second set 17 is folded over onto the first set to be interengaged with the groove 15a, while simultaneously therewith profiles 13b and 14b are being interengaged. This unique folding provides the two double profile film strips 18 and 19 which are utilized to form bags in the manner illustrated in FIG. 6.

FIG. 2 illustrates the manner in which the folding may be accomplished. An edge guide such as 39 having a concave groove may be provided to receive the doubled edges 20 or 21 of the film guide strip 16 and 17, and shaped metal or plastic guide strips hold the groove elements 14a and 14b in place as illustrated by the backing plate 33 and the guide plates 34, 35 and 36. The rib 13b is guided and pressed to interlock into the groove 14b by shaped plates 34a and 35a and backing plate 33a.

The rib 12a is brought over onto the second set 17 by curved plates 37 and 38 and backing plate 38a which bring the rib 12a along the path indicated by the broken lines into the dotted line position of 12a where it is pressed into the groove 14a. A similar mechanism is provided for folding the lower layer of the film to bring the rib 13a into the groove 15a.

The resultant dual double profile film strips 18 and 19 are formed into bags by cross-cutting and sealing. The resultant bags are illustrated in FIGS. 3 and 4. The plastic film bags such as shown as 25 have a folded bottom 29 and cut and sealed side edges 30 and 31. The profiles are joined at 26 with groove profile 26a receiving rib profile 26b. Above the profiles are short flanges 27 and 28 which permit the user to pull the profiles apart for opening the bag.

FIG. 5 illustrates a modified and less desirable form of film, but one which is constructed in accordance with the principles of the present invention. In the film of FIG. 5, a first pair 41 of profiles is located within the tube 40, and a second pair 42 of profiles is located diametrically opposite the first pair 41. A third pair 43 of profiles is located between the first and second pair, and a fourth pair 44 is positioned diametrically opposite the third pair 43. Each pair consists of a male and female with their locations being alternated as the tube is viewed progressing clockwise or counter-clockwise within the tube.

When the tube of FIG. 5 is slit, the first slit, which is made by the knife 45 will be located between the profiles of the first pair 41, and the groove element 41a will be folded over onto the rib element 43a. The second slit will be made by the knife 46 between the profiles of the second pair 42, and the groove profile 42a will be folded over onto the rib profile 44a, in the same manner as illustrated in FIG. 1.

With reference to FIG. 1, the knives 45 and 46 may be located so that instead of cutting between the rib elements, they cut between the groove elements. In such arrangement, knife 45 will cut a slit between the groove elements 15a and 15b of the pair 15, and the knife 46 will slit midway between the groove elements 14a and 14b of the pair 14. When the slits are made, the tube will be folded so that the groove 15a is brought over onto the rib 13a. The groove 14a will be brought over onto the rib 12a. Similarly, with respect to the arrangement shown in FIG. 5, slits may be made between the pairs 43 and 44, and the tube would be folded to align the rib and profile elements. In each case the folding will result in double bag strips such as 18 and 19 in FIG. 1.

As the two double profile film strips 18 and 19 are formed, they are wound onto rolls 22 and 23. These rolls may either be used separated to form two bags or simultaneously used to form four bags. As illustrated in FIG. 6, the roll 22 is unrolled with the profile film strip 18 being fed into a perforation device 50 which forms a longitudinal line of perforations 51 in the tube layer opposite the slit 48. The tubing is then fed into a sealing and cutting mechanism 52 wherein spaced cross-seals are made to form side seals such as 53 and 54 at the edges of the bags and the bags are cut apart at their side edges. The bags are stacked in a stacking tray 55, and when removed, can be torn apart at their top edges to separate the stacks 56 and 57 at the center separation 58. The separate stacks then may be banded such as shown by bands 59 and 60.

While preferred forms are illustrated, tubing may be extruded with 12 profiles on the inner surface or with 16, or any additional multiples divisible by 4. Each set of 4 profiles will form an additional double bag strip, and the total number is limited only by the capability of handling the material and the size of the die and the equipment which must be provided. In each instance where additional profiles are added in multiples of 4, the same positional relationship of profiles is used with pairs of closely spaced elements and slits made between alternate pairs, and one profile adjacent the slit folded over onto the profile next to it. The pairs are arranged relatively close to each other, slits are made in alternate pairs around the periphery of the tubing, and the profiles are brought together to mate with the profile which is adjacent it in the next pair. The spacing between pairs, of course, is chosen dependent on the size of the bag which is to be produced as will be apparent from the resultant bag shown in FIGS. 3 and 4. The closeness of the profiles in each pair will be chosen in accordance with the length of the flap or flange at the top of the bag. As will be understood from the foregoing description, when tubing is extruded with 12 or more profiles on the inner surface, slits are made between alternate pairs of profiles, and the pairs of profiles in a 12 profile bag are not diametrically opposite each other. In accordance with the present invention, the tubing is extruded with at least 4 pairs of profiles, and the pairs can be increased, but must be done so in multiples of 2. In some instances, it may be desirable to locate the profiles on the external surface of the tubing, although the profile location on the inner surface is preferred.

Thus, it will be seen that we have provided an improved method and mechanism which meets the objectives above set forth and which is capable of utilization for increasing output and reducing scrap rate. The mechanism doubles the production of structures which are capable of producing dual bags and quadruples the output of structures which produce single bags without disadvantages to the resultant bag structure.

We claim as our invention:

1. The method of making flexible plastic bags with integral pressure interlocking rib and groove elements on the confronting top edges comprising the steps:
   extruding a continuous tube with a first pair of closely spaced interior rib elements a second pair of closely spaced interior rib elements diametrically opposed from the first pair,
   a first pair of closely spaced interior groove elements intermediate the pairs of rib elements, and
   a second pair of closely spaced interior groove elements diametrically opposed from the first pair of groove elements;
   slitting the tube between the elements of each of the pair of groove elements or each of the pairs of rib elements; and
   folding the slit tube to form two double profile films for conversion into sets of interlocking bags.

2. The method of making flexible plastic bags with integral pressure interlocking rib and groove elements on the confronting top edges comprising the steps of claim 1 wherein the step of slitting is further defined by:
   slitting the tube between adjacent elements of each of the pairs of one of the groove elements or rib elements.

3. The method of making flexible plastic bags with integral pressure interlocking rib and groove elements on the confronting top edges comprising the steps of claim 1:
   and including the step of flattening the tube so as to align each pair of rib elements with an adjacent pair of groove elements so as to form first and second profile film sets with each set including two aligned rib and groove elements.

4. The method of making flexible plastic bags with integral pressure interlocking rib and groove elements on the confronting top edges comprising the steps of claim 3 wherein the steps of slitting and folding are further defined by:
   slitting the tube between adjoining elements of two of each of the pairs of either groove elements or rib elements; and
   folding the tube so as to bring one of the elements adjacent the slit of each set over onto the other set to provide two strips of double profile film strips.

5. The method of making flexible plastic bags with integral pressure interlocking rib and groove elements on the confronting top edges comprising the steps of claim 4:
   including joining in interlocked relationship opposed rib and groove elements.

6. The method of making flexible plastic bags with integral pressure interlocking rib and groove elements on the confronting top edges comprising the steps of claim 5:
   including rolling each of the strips into a roll.

7. A method of making a plastic film structure for forming bags having integral pressure interlocking rib and groove elements on the confronting top edges constructed in accordance with claim 1 wherein the step of slitting is further defined by:
   forming a first longitudinal continuous slit between elements of the first pair of one of said rib or groove elements and a second slit extending longitudinally continuously between the others of said pair of rib or groove elements.

8. A method of making a plastic film structure for forming bags having integral pressure interlocking rib and groove elements on the confronting top edges constructed in accordance with claim 1 wherein the step of folding is further defined by:
   aligning the rib elements of the first pair with the groove elements of the first pair and aligning the rib elements of the second pair with the groove elements of the second pair to form first and second sets with one element of each of said sets adjacent said slit being brought over to the other element in each set by folding the film into the other set.

9. A method of making a plastic film structure for forming bags having integral pressure interlocking rib and groove elements on the confronting top edges constructed in accordance with claim 9 wherein the step of folding is further defined by:
   flattening the film for each of the sets and interlocking the rib and groove elements of the set.

10. The method of making flexible plastic bags with integral pressure interlocking rib and groove elements on the confronting top edges comprising the steps:
    extruding a continuous tube with a first pair of closely spaced interlocking elements and a second pair of closely spaced interlocking elements diametrically opposed from the first;
    a third pair of closely spaced interlocking elements intermediate the first and second pairs and a fourth pair diametrically opposed to the third pair,
    said interlocking elements being on the inner surface of the tube;
    said tube being flattened so that said first and fourth pair of interlocking elements are aligned and said second and third pair of interlocking elements are aligned to form first and second film sets;
    forming a first slit through one layer of the first set and a second slit through the opposite layer of the second set; and
    folding one of said profiles of the first set adjacent said first slit over into the second set, and another of said profiles of said second set and adjacent said second slit over into the first set.

11. A method of making a plastic film structure for forming bags with integral pressure interlocking rib and groove elements on the confronting top edges comprising the steps of:
    forming a continuous one-piece tube hang on the inner surface thereof a first pair of closely spaced interlocking elements, a second pair of closely spaced interlocking elements,
    providing a third pair of closely spaced interlocking elements intermediate the first and second pairs, and a fourth pair of closely spaced interlocking elements positioned diametrically opposed to the third pair, each of said pairs including a rib and groove element with the rib and groove elements alternating in a circumferential direction around the tube;

flattening said tube so that the first and fourth pair are aligned and the second and third pair are aligned to form first and second sets; slitting the tube longitudinally through one layer of the first set and through the opposite layer of the second set; and folding one of the elements of the first set adjacent the first slit over onto the second set and folding another of said elements of the second set adjacent the second slit being over onto the first set.

12. The method of making flexible plastic bags with integral pressure interlocking rib and groove elements on the confronting top edges comprising the steps:

extruding a continuous tube with pairs of closely spaced interlocking elements on the surface of the tube, the total pairs being a multiple of 2 with at least 4 pairs on the tube;

slitting the tube lengthwise between profiles of alternate pairs; and folding the tube between each adjacent pair bringing the profile adjacent the slit over onto the closest profile of the pair which has not been slit.

13. A method of making a plastic film structure for forming bags with integral pressure interlocking rib and groove elements on the confronting top edges comprising in combination:

forming a continuous one-piece tube having on the surface thereof a plurality of pairs in multiples of 2 profiles extending longitudinally along the tube, the profiles of each pair being more closely spaced to each other than the spacing between adjacent pairs;

forming the profiles as rib and groove elements and shaping them to pressure interlock with each other, and slitting the tube longitudinally between elements of alternate pairs and folding to bring the profile element beside the slit over onto the closest profile of the adjacent unslit pair of the profiles and effecting mating and interlocking thereof.

14. A method of making a plastic film structure for forming bags with integral pressure interlocking rib and groove elements on confronting top edges constructed in accordance with claim 13:

comprising forming the tube with 4 pairs of profiles on the surface.

* * * * *